Patented July 30, 1946

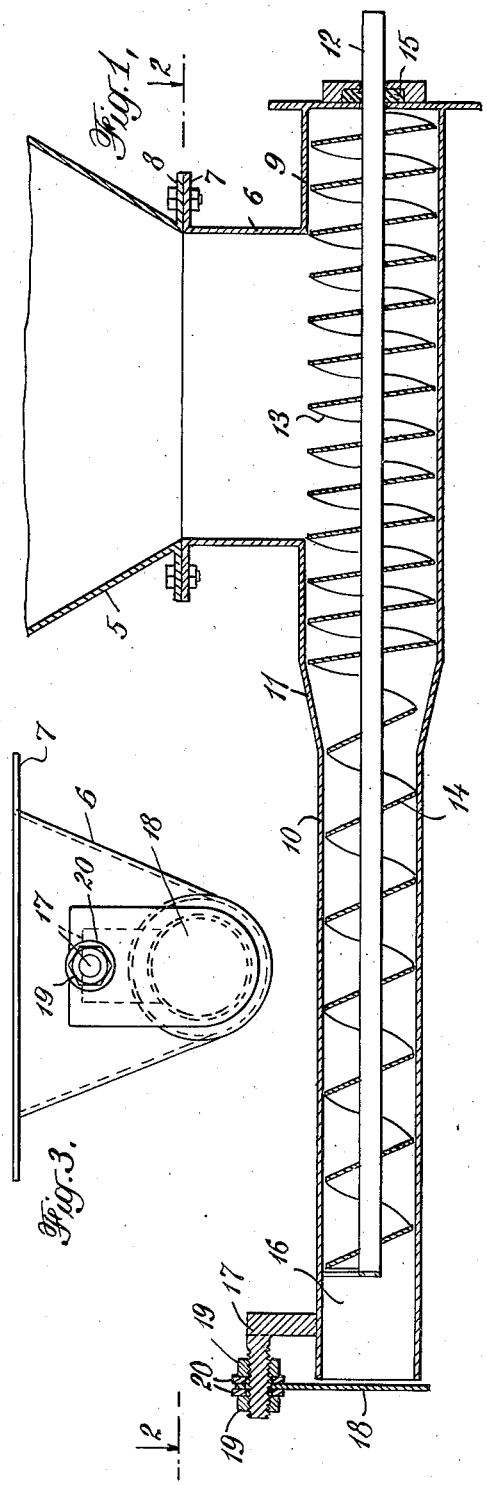
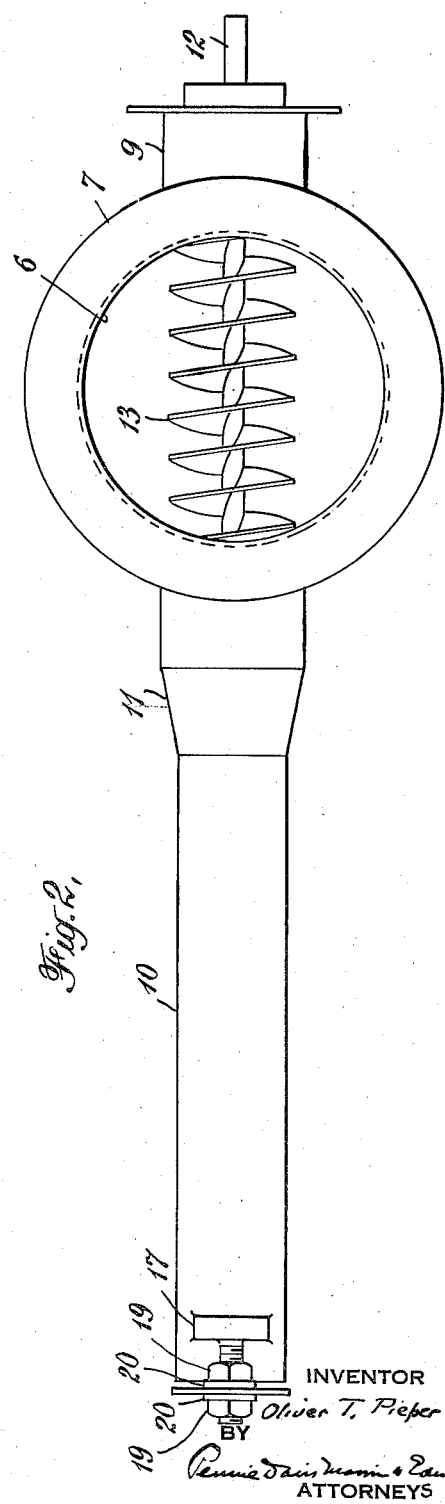

2,404,884

UNITED STATES PATENT OFFICE 2,404,884

APPARATUS FOR HANDLING POWDERED MATERIALS

Oliver T. Pieper, Wilmington, Del., assignor to American Dyewood Company, New York, N. Y., a corporation of Pennsylvania Application March 12, 1945, Serial No. 582,244

2 Claims. (Cl. 198—213)

This invention relates to apparatus for removing powdered materials from vessels under partial vacuum and particularly to improvements which ensure the proper functioning of such apparatus.

Powdered materials of various kinds employed in industrial operations are notoriously difficult to handle because of inherent characteristics of such materials. Special problems are presented when such materials are discharged from vessels under partial vacuum such as dust separators wherein the materials are recovered from suspension in gases. In such cases, the partial vacuum produces a reverse current of air through the discharge mechanism which prevents the powdered material from entering and traveling in the direction of discharge.

It is the object of the present invention to provide a simple and effective apparatus capable of ensuring the desired delivery of the powdered material uniformly and without the usual difficulty from a vessel operating at a pressure below atmospheric.

Other objects and advantages of the invention will be apparent as it is better understood by reference to the following specification and the accompanying drawing, in which Fig. 1 is a longitudinal section through an apparatus embodying the invention;

Fig. 2 is a plan view of the apparatus; and

Fig. 3 is an end elevation thereof.

Referring to the drawing, 5 indicates the lower or discharge portion of a chamber in which powdered material is handled, as for example a dust separator of the cyclone type which is usually operated at a minus pressure. While the invention is particularly designed to operate in connection with a dust separator, it may be utilized to discharge powdered material from any type of container.

An inlet 6 is connected to the chamber 5 by flanges 7 and 8 or other suitable arrangement and delivers the material into a cylindrical housing 9 having an extension 10 of smaller cross-sectional area and a reducing section 11 between the housing and the extension.

A shaft 12 extends through the housing 9 and extension 10 to a point short of the end of the extension and carries helical conveyors 13 and 14 which are adapted to receive the powdered material and to advance it toward and through the extension 10. The shaft 12 may be driven in any suitable manner as for example by a belt or by a motor. A sealing ring 15 is disposed about the shaft 12 at one end of the housing 9 to prevent leakage of air into the housing.

The diameter of the helical conveyor 13 should be sufficiently large to prevent arching of the powdered material flowing into the housing 9. The diameter will vary, depending upon the characteristics of the particular material handled. The pitch of the helical conveyor 13 should be such that its capacity is slightly less than that of the helical conveyor 14 in the extension 10. As the material is moved forwardly by the helical conveyor 13, it is delivered to the conveyor 14, the diameter of which is sufficiently smaller than the diameter of the conveyor 13 so as to cause formation of a plug of the powdered material in the open end 16 of the extension 10. This plug will be sufficiently dense so that air will not pass in the reverse direction even though the powdered material is fed from the chamber 5 under less than atmospheric pressure. The plug will advance continuously and will be delivered through the open end of the extension 10.

To permit starting of the operation, it is necessary to temporarily close the open end of the extension 10. Otherwise the reverse flow of air will prevent the powdered material from falling into and moving through the conveyor. I therefore provide a bracket 17 which supports a flap 18 of any suitable flexible material such as rubber, neoprene or fabric saturated with such materials. The flap 18 is slightly spaced from the open end of the extension 10 and is held on the bracket 17 by nuts 19 and washers 20 or any other convenient device. When operation is initiated, the flap 18 is forced against the open end of the extension 16 by atmospheric pressure because of the minus pressure within the conveyor. The powdered material will then flow through the conveyor until a suitable plug is established in the end 16. However, after such a plug has been established and the pressure on opposite sides of the flap has been equalized, the flap again hangs free and does not prevent the release of the powdered material from the open end of the extension 10.

The apparatus as described affords an effective solution of the problem of handling powdered material and particularly material which is discharged from a chamber or receptacle operating under a pressure below atmospheric. The apparatus has been utilized successfully, and it avoids the difficulties which have been met heretofore in handling powdered materials under the conditions mentioned.

Various changes may be made in the form and construction of the apparatus without departing from the invention or sacrificing the advantages thereof.

I claim:

1. In an apparatus for discharging powdered material, a housing having an inlet, an extension of reduced diameter connected to the housing, a rotatable shaft within the housing and extension, helical conveyor means on the shaft conforming to the diameters of the housing and extension and terminating short of the end of the extension, the pitch of the conveyor means in the extension being such that its capacity slightly exceeds that of the conveyor means in the housing and a flexible flap so suspended adjacent and opposite the outer end of the extension that normally it exerts no appreciable pressure against the outer end of the extension, said flap being adapted to engage and close the outer end of the extension when a negative pressure exists within the extension.

2. In an apparatus for discharging powdered material, a housing having an inlet, an extension of reduced diameter connected to the housing, a rotatable shaft within the housing and extension, helical conveyor means on the shaft conforming to the diameters of the housing and extension and terminating short of the end of the extension, a flexible flap so suspended adjacent and opposite the outer end of the extension that normally it exerts no appreciable pressure against the outer end of the extension, said flap being adapted to engage and close the outer end of the extension when a negative pressure exists within the extension, and means for adjusting the position of the flexible flap relative to the outer end of the extension.

OLIVER T. PIEPER.